United States Patent [19]

Waterhouse

[11] 3,888,040
[45] June 10, 1975

[54] MINIATURE TOY CAMPER TRAILER
[75] Inventor: Harlan L. Waterhouse, Excelsior, Minn.
[73] Assignee: Tonka Corporation, Hopkins, Minn.
[22] Filed: May 10, 1974
[21] Appl. No.: 468,920

[52] U.S. Cl. ................................................ 46/201
[51] Int. Cl. ........................................... A63h 17/00
[58] Field of Search ................. 46/201, 202; 202/29

[56] References Cited
UNITED STATES PATENTS

| | | | |
|---|---|---|---|
| 2,035,830 | 3/1936 | Parkin.................................. | 220/29 |
| 2,105,550 | 1/1938 | Pilliod et al........................... | 220/29 |
| 3,619,940 | 11/1971 | Good et al............................ | 46/216 |

FOREIGN PATENTS OR APPLICATIONS

| | | | |
|---|---|---|---|
| 1,005,505 | 9/1965 | United Kingdom.................. | 46/201 |

*Primary Examiner*—Louis G. Mancene
*Assistant Examiner*—Robert F. Cutting
*Attorney, Agent, or Firm*—Douglas L. Carlsen; Andrew E. Carlsen

[57] ABSTRACT

A miniature toy camper type trailer having a rectangular opening in the roof and a flexible sliding door mounted on tracks within the trailer housing and slidable in a direction longitudinally of the trailer between a position covering the opening and a stored position clear of the opening. The flexibility of the door allows it to bend along an end and bottom wall of the trailer when it is stored.

3 Claims, 4 Drawing Figures

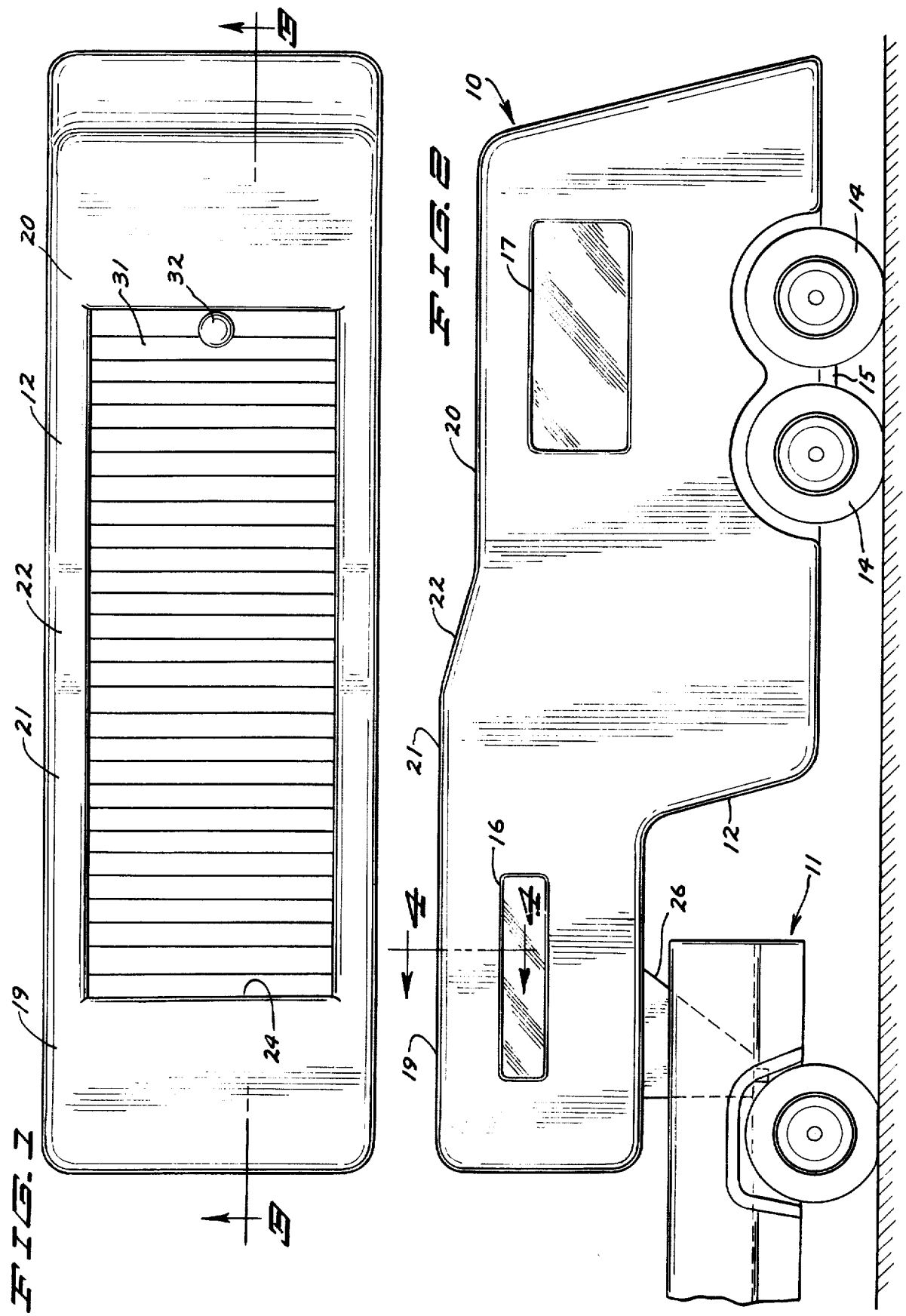

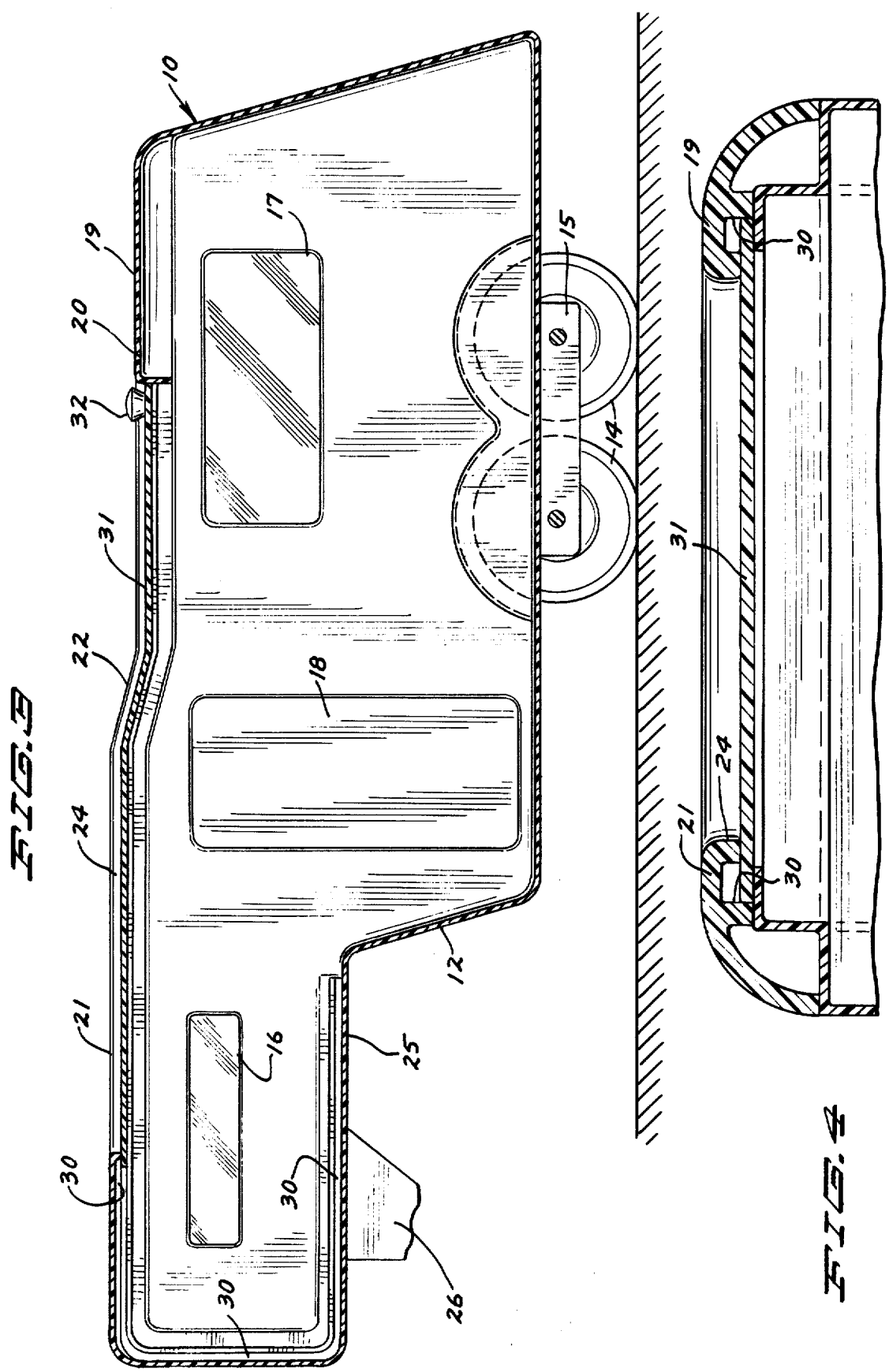

MINIATURE TOY CAMPER TRAILER

Miniature toy house trailers or campers have not heretofore been particularly successful as a toy item. It is believed that one reason for this is the fact that the interior of the trailer has only been accessible through a side or rear door of the trailer housing thus rendering placement and rearrangement of furniture items or the like within the trailer very difficult.

The object of the present invention is to provide a toy camper trailer having a relatively large opening in the roof thereof allowing a child playing with the trailer to freely move articles about within the camper housing and having a door for closing the opening when such is desired.

The invention broadly comprises a toy trailer of the camper or house type having an elongated rectangular opening extending along the roof, a pair of tracks mounted on the housing and extending along the sides of the opening and then downwardly along an end wall of the housing in spaced, parallel, opposing relation, and a door of flexible material of substantially the size and shape of said opening and having its side edges slidably disposed in said tracks for movement between covering and uncovering positions relative to the opening.

BRIEF DESCRIPTION OF THE DRAWINGS

In the drawings:

FIG. 1 is a plan view of a toy trailer embodying the present invention.

FIG. 2 is a side elevation of the trailer shown hitched in draft relation to the rear portion of a toy truck.

FIG. 3 is a longitudinal vertical section through the trailer taken on line 3—3 of FIG. 1.

FIG. 4 is an enlarged fragmentary transverse vertical section through the upper portion of the trailer taken on line 4—4 of FIG. 2.

DESCRIPTION OF THE PREFERRED EMBODIMENT

Referring now more particularly to the drawings reference numerals will be used to denote like parts or structural features in the different views. The trailer is denoted generally by the number 10 and is shown in FIG. 2 connected in draft relation to the rear portion of a toy truck 11. The trailer has a body 12 supported on two wheel and axle assemblies 14 journaled in a bracket 15 mounted on the underside of the body. The body is provided with windows 16 and 17 and a door 18. The top or roof 19 of the trailer has two levels denoted at 20 and 21 connected by an inclined portion 22.

The roof has an elongated rectangular opening 24 which extends along the roof portion 20, through portion 22 and into portion 21. The front end of the trailer has an elevated bottom 25 enabling the body to extend over the box of truck 11 and be pivotally hitched thereto by a support post 26.

A pair of inwardly opening opposing tracks 30 are formed to extend along the roof portions 20, 22 and 21 along each side of and just under the opening 24. These tracks 30 further extend downwardly along the front wall of the trailer and then rearwardly over bottom wall 25 curving at the bends between the walls.

A rectangular sliding door 31 having a handle 32 near its rear end is mounted for longitudinal sliding movement in the tracks 30. This door is only slightly wider than opening 24 to completely close the opening when the door is in its rearward position shown in FIGS. 1 and 3.

Door 31 is longitudinally flexible so that it can fit in and slide along the entire length of tracks 30 from roof sections 20, 22 and 21 downwardly along the front wall and rearwardly along wall 25. The door may be formed of any relatively heavy flexible material. It is here shown, however, as being formed of relatively narrow slats which are rigid in a direction transversely of the trailer and which are suitably interconnected by sheet material such as fabric.

It will be understood that when a child playing with the toy wishes to place or rearrange items within the trailer housing, he or she merely pushes forwardly on handle 32 and door 31 will slide forwardly into an out of the way position in the front of the trailer.

Having now therefore fully illustrated and described my invention, what I claim to be new and desire to protect by letters Patent is:

1. In a miniature toy trailer,
   a. a trailer body carrying means for hitch connection to a draft vehicle and having side walls connected by a roof,
   b. the roof having an opening therein centered between the side walls,
   c. the side walls having opposing tracks extending in parallelism under and at each side of the roof opening and extending beyond the opening,
   d. a sliding door having its side edges disposed in said tracks for sliding movement of the door between open and closed positions relative to the opening.

2. The subject matter of claim 1 wherein the door has an upwardly projecting handle.

3. The subject matter of claim 1 wherein the said tracks extend to an end wall of the trailer and then downwardly therealong, and said door being longitudinally flexible for travel of said door onto and along said track extension when moved to an open position.

* * * * *